United States Patent
Nakajima et al.

(10) Patent No.: US 11,038,449 B2
(45) Date of Patent: Jun. 15, 2021

(54) VEHICLE GENERATOR CONTROL DEVICE

(71) Applicant: Mitsubishi Electric Corporation, Tokyo (JP)

(72) Inventors: Masahiro Nakajima, Tokyo (JP); Kensuke Kitamura, Tokyo (JP); Katsuyuki Sumimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/607,120

(22) PCT Filed: May 24, 2017

(86) PCT No.: PCT/JP2017/019359
§ 371 (c)(1),
(2) Date: Oct. 22, 2019

(87) PCT Pub. No.: WO2018/216136
PCT Pub. Date: Nov. 29, 2018

(65) Prior Publication Data
US 2020/0304046 A1    Sep. 24, 2020

(51) Int. Cl.
*H02P 9/02*    (2006.01)

(52) U.S. Cl.
CPC ..................... *H02P 9/02* (2013.01)

(58) Field of Classification Search
CPC ........................................................ H02P 9/02
See application file for complete search history.

(56) References Cited

U.S. PATENT DOCUMENTS

| 6,014,016 A | 1/2000 | Maruyama et al. |
|---|---|---|
| 2002/0036485 A1 | 3/2002 | Okuno et al. |
| 2004/0008008 A1* | 1/2004 | Uematsu ................. H02H 7/06 322/28 |
| 2007/0029977 A1* | 2/2007 | Asada ....................... H02P 9/02 322/24 |
| 2007/0085512 A1 | 4/2007 | Maehara |

(Continued)

FOREIGN PATENT DOCUMENTS

| JP | 07-039200 A | 2/1995 |
|---|---|---|
| JP | 10-051976 A | 2/1998 |

(Continued)

OTHER PUBLICATIONS

Communication dated Apr. 15, 2020 from the European Patent Office in application No. 17910603.4.

(Continued)

*Primary Examiner* — Sean Gugger
(74) *Attorney, Agent, or Firm* — Sughrue Mion, PLLC; Richard C. Turner

(57) ABSTRACT

A control device for a vehicle generator includes a shared terminal to be connected to a communication IF or a lamp IF via a switch; and a nonvolatile PROM which controls the switch based on shared terminal setting data and carries out switching between the IFs to be connected to the shared terminal. The PROM stores therein shared terminal setting data "communication IF effective" as its initial setting. The shared terminal setting data stored in the PROM can, when necessary, be rewritten into "lamp IF effective" via the shared terminal, the communication IF, and a memory controller.

12 Claims, 5 Drawing Sheets

(56) References Cited

U.S. PATENT DOCUMENTS

| | | | |
|---|---|---|---|
| 2008/0136379 A1 | 6/2008 | Sumimoto | |
| 2013/0271093 A1 | 10/2013 | Komurasaki et al. | |
| 2013/0335039 A1* | 12/2013 | Komurasaki | H02P 9/305 |
| | | | 322/28 |

FOREIGN PATENT DOCUMENTS

| | | |
|---|---|---|
| JP | 11-027260 A | 1/1999 |
| JP | 2002-112595 A | 4/2002 |
| JP | 2008-148488 A | 6/2008 |
| JP | 2013-219965 A | 10/2013 |

OTHER PUBLICATIONS

International Search Report of PCT/JP2017/019359 dated Aug. 15, 2017 [PCT/ISA/210].

* cited by examiner

VEHICLE GENERATOR CONTROL DEVICE

CROSS REFERENCE TO RELATED APPLICATIONS

This application is a National Stage of International Application No. PCT/JP2017/019359, filed May 24, 2017.

TECHNICAL FIELD

The present invention relates to a vehicle generator control device.

BACKGROUND ART

A design has heretofore been such that when it is necessary, after completion of circuit design, to switch between the functions of an LSI configuring a vehicle generator control device, data of ROMs (Read Only Memories) which are nonvolatile memory elements are changed from one to another, thus switching between the functions. The ROMs include a programmable ROM to which data can be written in a specific procedure and a mask ROM to which no data can be written, and the programmable and mask ROMs are used accordingly.

The methods of changing the data of the ROMs differ depending on interface circuits (hereafter, IFs) included in the LSI. For example, in the case of a type A which has a communication IF which carries out transmission and reception of data with an external instrument, rewriting of the data of the programmable ROM is carried out utilizing the communication IF. Also, for example, in the case of a type B which has a lamp IF, which controls lamp lighting which indicates an anomaly of a vehicle generator, and has no communication IF, switching between the functions of the LSI is carried out by a change to the mask ROM by layout redesign.

As a related art of the vehicle generator control device, it is disclosed in PTL 1 that with the configuration of using in common an excitation current supply command signal input terminal and a voltage control section control property change command signal input terminal, one terminal is shared by a plurality of input IFs, thus suppressing an increase in the number of terminals and external wirings. Also, as for suppressing an increase in the number of terminals, PTL 2 discloses a multifunctional universal port wherein a plurality of functions are allocated to one terminal, thus carrying out a selection from the functions with a setting of a built-in volatile memory.

CITATION LIST

Patent Literature

PTL 1: JP-A-07-39200
PTL 2: JP-A-11-27260

SUMMARY OF INVENTION

Technical Problem

As heretofore described, in the heretofore known vehicle generator control device, when the methods of changing the data of the memory elements differ from one another as between the type A having the communication IF and the type B having no communication IF, the individual types have been developed as separate kinds. Because of this, there is a problem in that many LSI kinds need to be developed, impairing efficiency in development. Also, when the type B is provided with a dedicated pin for the communication IF in order to use another LSI kind in addition, there is a problem in that the number of LSI terminals and external wirings increases, and besides, layout redesign is needed, leading to an increase in development man-hours.

In PTL 1, the increase in the number of terminals is suppressed by sharing one terminal with a plurality of one-direction input IFs, but there is a problem in that bidirectional input and output IFs cannot share one terminal. Particularly when using another LSI kind in addition, terminal sharing which enables a combination including the bidirectional IFs is required. Also, in the case of PTL 2, it is possible, by utilizing the volatile memory, to switch between IFs allocated to one terminal, but there is a problem in that switching information is lost when powered off. Also, when intending to restore a once switched IF to the original IF, it cannot be realized by a method other than powering off.

The invention, taking into consideration the heretofore mentioned problems, has for its object to provide a vehicle generator control device which can suppress an increase in the number of terminals and wirings and also can be used for a plurality of types with one LSI kind.

Solution to Problem

The vehicle generator control device according to the invention includes a plurality of interface circuits including a communication interface circuit which carries out transmission and reception of data with an external instrument; a shared terminal which, being a common terminal of the plurality of interface circuits, is connected to one of the plurality of interface circuits via a switch circuit; and a nonvolatile programmable ROM which, as well as storing therein shared terminal setting data which sets the interface circuit to be connected to the shared terminal, controls the switch circuit based on the shared terminal setting data, carrying out switching between the interface circuits to be connected to the shared terminal.

Advantageous Effects of Invention

According to the vehicle generator control device of the invention, the shared terminal setting data is set in advance as the initial setting of the programmable ROM so that the communication interface circuit is connected to the shared terminal, thereby it being possible, when necessary, to rewrite the shared terminal setting data, which is stored in the programmable ROM, via the shared terminal and the communication interface circuit, and so it is possible to suppress an increase in the number of terminals and wirings, and also possible to use the control device for a plurality of types with one LSI kind.

The foregoing and other objects, features, aspects, and advantages of the invention will become more apparent from the following detailed description of the invention referring to the drawings.

DESCRIPTION OF EMBODIMENTS

First Embodiment

Figure 1:
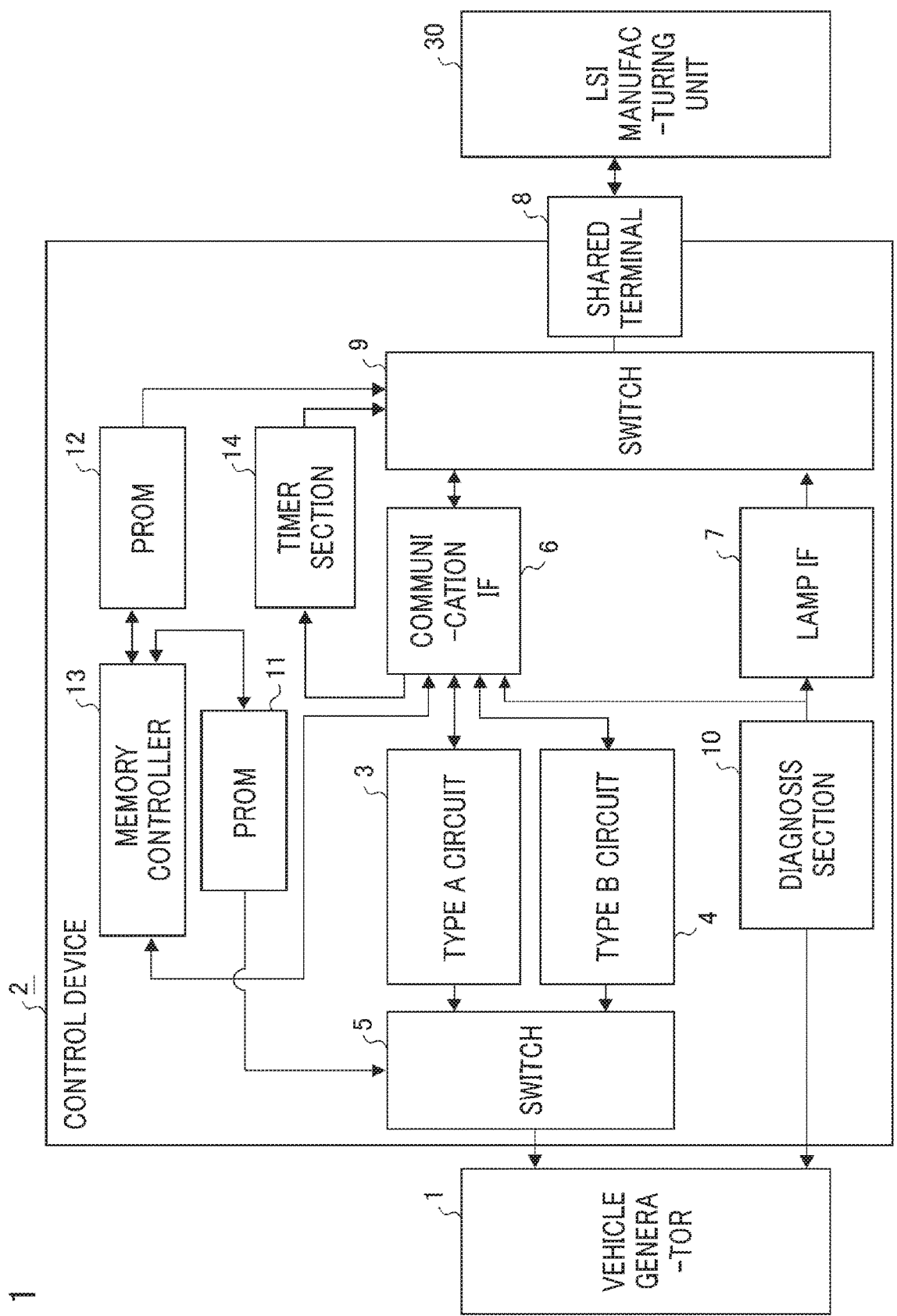
FIG. 1 is a diagram showing the configuration of a vehicle generator control device according to the first embodiment of the invention.
Figure 2:
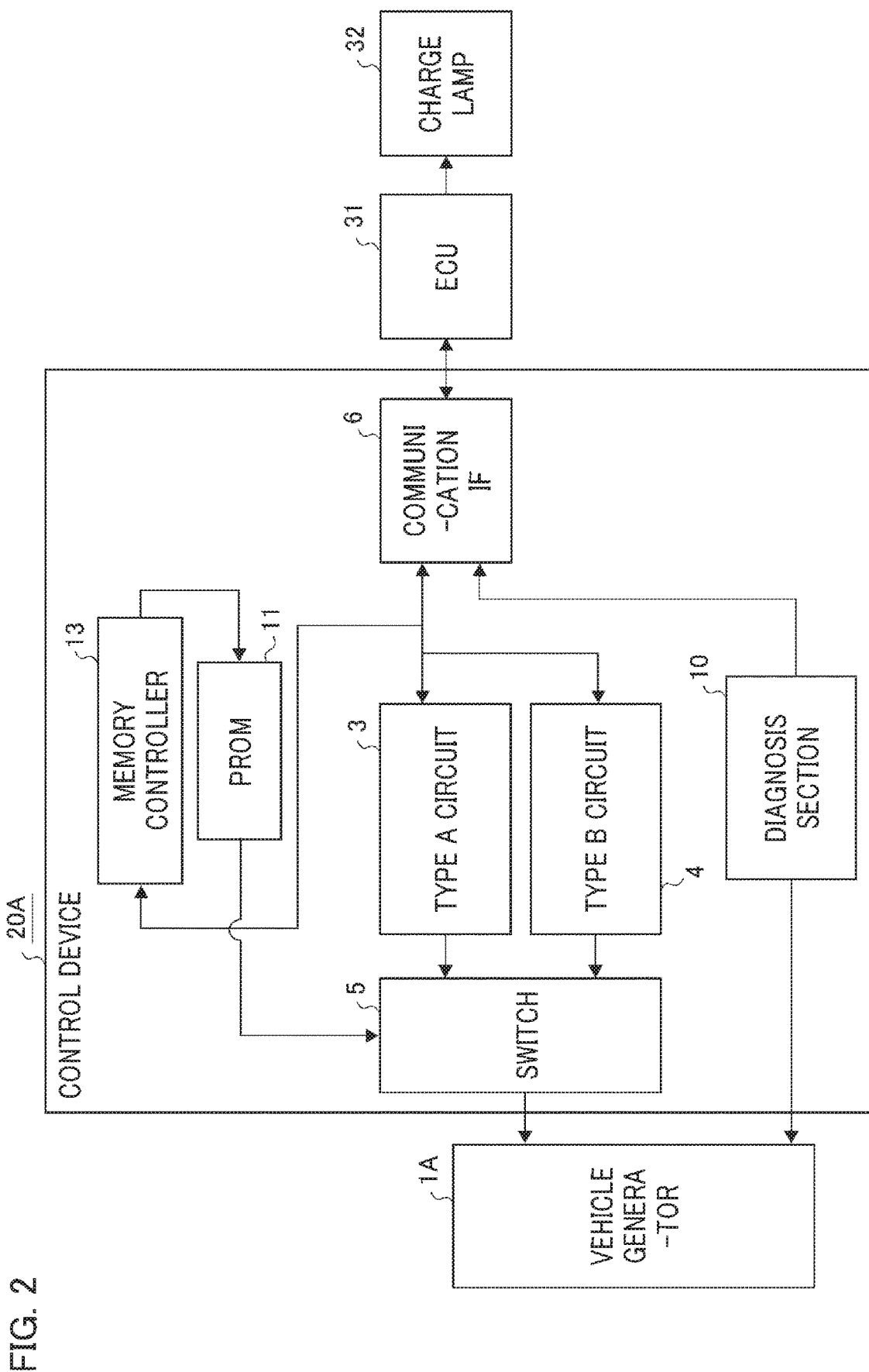
FIG. 2 is a diagram showing the configuration of a vehicle generator control device which is a comparison example of the invention.
Figure 3:
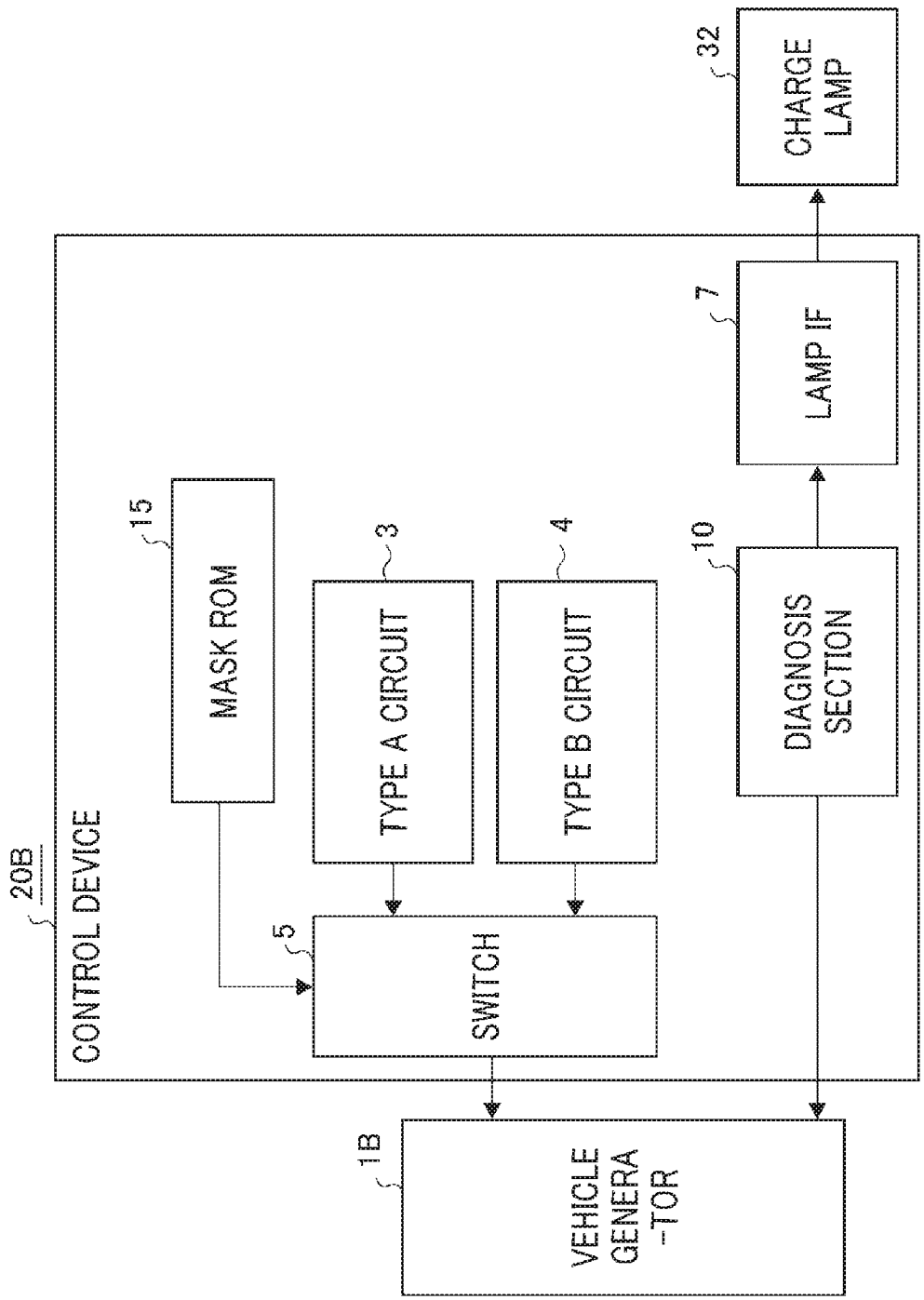
FIG. 3 is a diagram showing the configuration of a vehicle generator control device which is a comparison example of the invention.

Hereafter, a description will be given, based on the drawings, of a vehicle generator control device according to the first embodiment of the invention. FIG. 1 is a block diagram showing the configuration of the vehicle generator control device according to the first embodiment. Also, FIGS. 2 and 3 are block diagrams showing the configurations of vehicle generator control devices, respectively, which are comparison examples of the invention. In the individual drawings, identical signs are given to identical and equivalent portions.

A vehicle generator 1 according to the first embodiment is, for example, a three-phase AC generator, and a control device 2 is an LSI (Large-Scale Integration). The control device 2, being designed so as to be usable for a plurality of types of the vehicle generator 1 (in the example shown in FIG. 1, a type A and a type B), includes a type A circuit 3 which realizes the function for the type A and a type B circuit 4 which realizes the function for the type B. The type A circuit 3 and the type B circuit 4 are connected to the vehicle generator 1 via a switch 5 which is a switch circuit.

Also, the control device 2 includes a plurality of IFs including a communication interface circuit 6 (hereafter, the communication IF 6) which carries out transmission and reception of data with an external instrument. In the example shown in FIG. 1, the control device 2 includes, in addition to the communication IF 6, a lamp interface circuit 7 (hereafter, the lamp IF 7). A shared terminal 8, being a terminal common to the communication IF 6 and the lamp IF 7, is connected either to the communication IF 6 or to the lamp IF 7 via a switch 9 which is a switch circuit.

A diagnostic section 10 is a circuit which monitors the conditions of its own device, that is, the control device 2 and of the vehicle generator 1 controlled by the control device 2 and determines whether or not there is an anomaly. The lamp IF 7, based on the determination by the diagnostic section 10, controls lighting of a lamp (not shown) connected to a vehicle's control device (not shown).

Also, the control device 2 includes a PROM 11 and a PROM 12, which are programmable ROMs, and a memory controller 13 which is a memory controller circuit. The PROM 11 and the PROM 12 are nonvolatile memory elements, to which data can be written and rewritten in a specific procedure.

The PROM 11, as well as storing therein type setting data which sets a by-type circuit to be connected to the vehicle generator 1, controls the switch 5 based on the type setting data, carrying out switching between the by-type circuits to be connected to the vehicle generator 1. For example, when the PROM 11 stores therein type setting data "type A circuit effective" as its initial setting, the vehicle generator 1 is connected to the type A circuit 3 via the switch 5.

The PROM 12, as well as storing therein shared terminal setting data which sets an IF to be connected to the shared terminal 8, controls the switch 9 based on the shared terminal setting data, carrying out switching between the IFs to be connected to the shared terminal 8.

The PROM 12 stores therein shared terminal setting data "communication IF effective" which is set, as its initial setting, so as for the communication IF 6 to be connected to the shared terminal 8, but the shared terminal setting data "communication IF effective" can, when necessary, be rewritten into shared terminal setting data "lamp IF effective" which is set so as for the lamp IF 7 to be connected to the shared terminal 8. The rewriting of the shared terminal setting data is implemented by a manufacturer of the control device 2 (LSI), a manufacturer of the vehicle generator 1, an automobile manufacturer, or the like, using an LSI manufacturing unit 30.

The memory controller 13 causes data received by the communication IF 6 to be stored in the PROM 11 or the PROM 12 and also carries out reading of the data stored in the PROM 11 or the PROM 12. A timer section 14 is a timer circuit which measures a period of time needed from the time its own device, that is, the control device 2 is powered on until it can be determined by the diagnostic section 10 whether or not there is an anomaly. The powering on of the control device 2 means starting of the vehicle generator 1.

When the shared terminal setting data is rewritten, the PROM 12, instead of carrying out the switching by the switch 9 immediately thereafter, but after the timer section 14 overflows after the control device 2 is powered on (after asynchronous reset is released), controls the switch 9, thus switching between the IFs to be connected to the shared terminal 8, from the communication IF 6 to the lamp IF 7.

That is, the communication IF 6 is effective until the timer section 14 overflows even after the shared terminal setting data of the PROM 12 is rewritten into "lamp IF effective". This enables the shared terminal setting data of the PROM 12 to be rewritten again into "communication IF effective" via the communication IF 6 by the time the timer section 14 overflows.

Furthermore, when a specific command is received via the communication IF 6 by the time the timer section 14 overflows, the timer section 14 is returned to its initial state by being cleared and reset and starts again to measure a period of time. The specific command, being a protocol which the communication IF 6 can decode, is communication data which, in practical operation, is not transmitted from an engine control unit (ECU). The specific command is input, before shipment of the control device 2, by a manufacturer of the control device 2 (LSI), a manufacturer of the vehicle generator 1, an automobile manufacture, or the like, using the LSI manufacturing unit 30 shown in FIG. 1.

Also, the PROM 12 is preferably protected by multiplexing or error correction. As an example of the multiplexing, there is a majority circuit which, having a plurality of information processing sections which carry out the same information processings on, for example, items of external input information, outputs a processing result decided by majority from among results of the information processings.

The error correction is the technique of detecting and correcting received error data or system error data, and there is a method of error correction using, for example, parity bits, a CRC (Cyclic Redundancy Check), or a humming code. It is possible, by including these protection functions, to prevent an accidental logical conversion of data caused by bit inversion due to cosmic rays or the like, a failure due to a defective LSI, data garbling due to aging deterioration, or the like.

A description will be given, using FIGS. 2 and 3, of the configurations of vehicle generator control devices which are comparison examples of the first embodiment. A control device 20A for a vehicle generator 1A shown in FIG. 2, having the communication IF 6, outputs a determination by the diagnostic section 10 to an ECU (Engine Control Unit) 31 and controls lighting of a charge lamp 32. Also, a control device 20B for a vehicle generator 1B shown in FIG. 3, having the lamp IF 7, controls lighting of the charge lamp 32 based on a determination by the diagnostic section 10.

The control devices 20A, 20B, when carrying out switching between the type A circuit 3 and the type B circuit 4, differ in their switching methods. The control device 20A shown in FIG. 2 writes switching data to the PROM 11 via the communication IF 6 and the memory controller 13. On the other hand, the control device 20B shown in FIG. 3, as it has no communication IF, carries out switching between the type A circuit 3 and the type B circuit 4 with a change to a mask ROM 15 by layout redesign. Products equipped with different IFs, such as the control devices 20A, 20B, have heretofore needed to be developed as separate kinds.

In contrast, the control device 2 according to the first embodiment writes switching data to the PROM 11 via the communication IF 6 and the memory controller 13, carrying out switching between the type A circuit 3 and the type B circuit 4. Furthermore, the shared terminal setting data "communication IF effective" stored in the PROM 12 can, when necessary, be rewritten into the shared terminal setting data "lamp IF effective". Consequently, the control device 2 according to the first embodiment can realize the functions of both the control devices 20A, 20B in the comparison examples with one LSI kind and can thus be used for the vehicle generators 1A, 1B.

Figure 4:
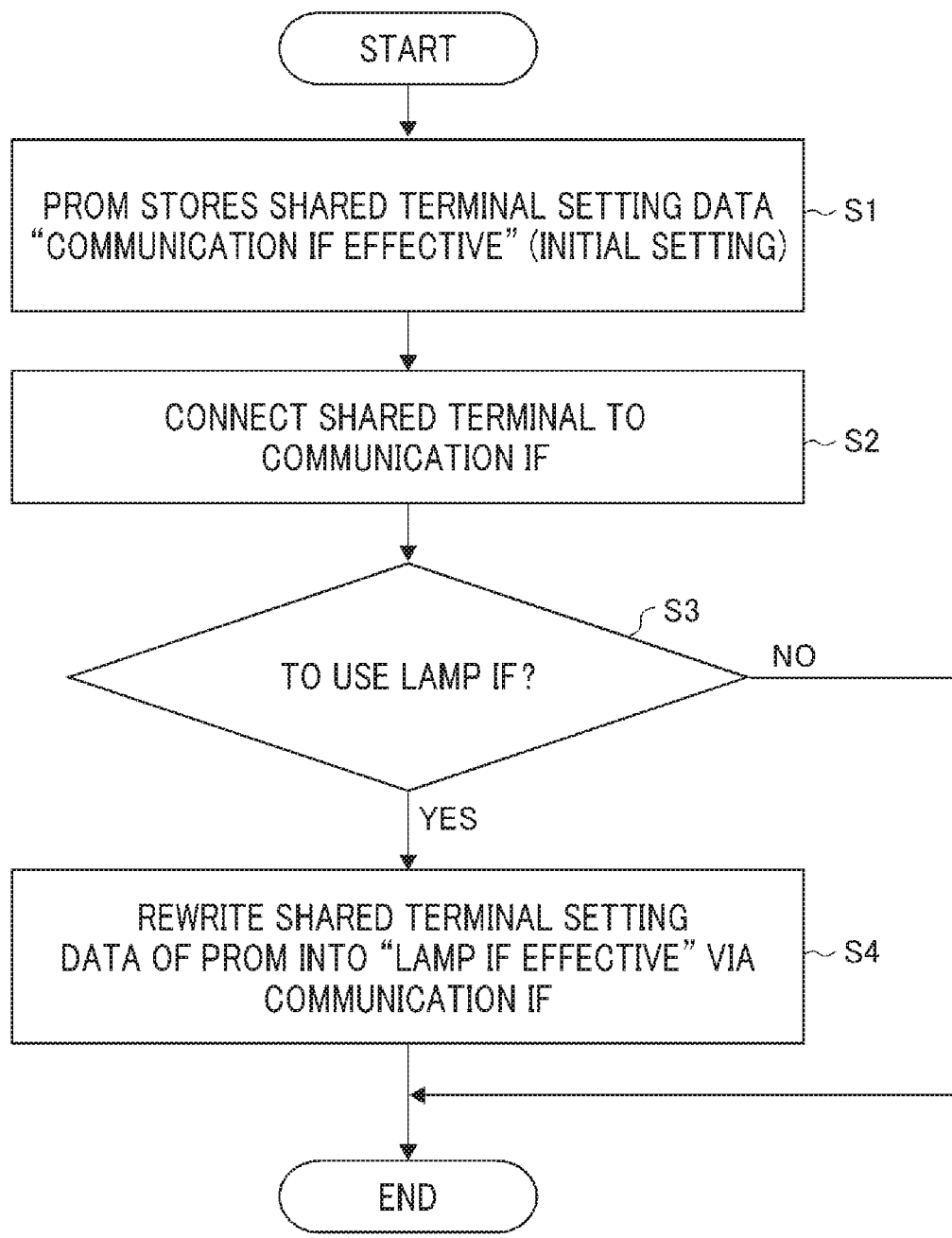
FIG. 4 is a flowchart showing a flow of processing wherein shared terminal setting data of a PROM is rewritten in the stage of manufacturing the vehicle generator control device according to the first embodiment of the invention.

Next, a description will be given, using the flowcharts of FIGS. 4 and 5, of the processing flows when carrying out switching between the IFs to be connected to the shared terminal 8 in the control device 2 according to the first embodiment. FIG. 4 shows the flow of processing wherein the shared terminal setting data of the PROM 12 is rewritten at the stage of manufacturing the LSI configuring the control device 2.

In step S1 of FIG. 4, the shared terminal setting data "communication IF effective" is stored in the PROM 12 as its initial setting. In step S2, the shared terminal 8 is thereby connected to the communication IF 6. Subsequently, in step S3, it is confirmed whether or not for an LSI to use the lamp IF 7 after shipment of the LSI.

In step S3, when using the communication IF 6 after shipment of the LSI (NO), it is only necessary to ship the LSI directly, thus ending the processing. In step S3, when using the lamp IF 7 after the shipment (YES), the processing goes to step S4, carrying out the processing of rewriting the shared terminal setting data of the PROM 12 into "lamp IF effective" via the shared terminal 8, the communication IF 6, and the memory controller 13.

Figure 5:
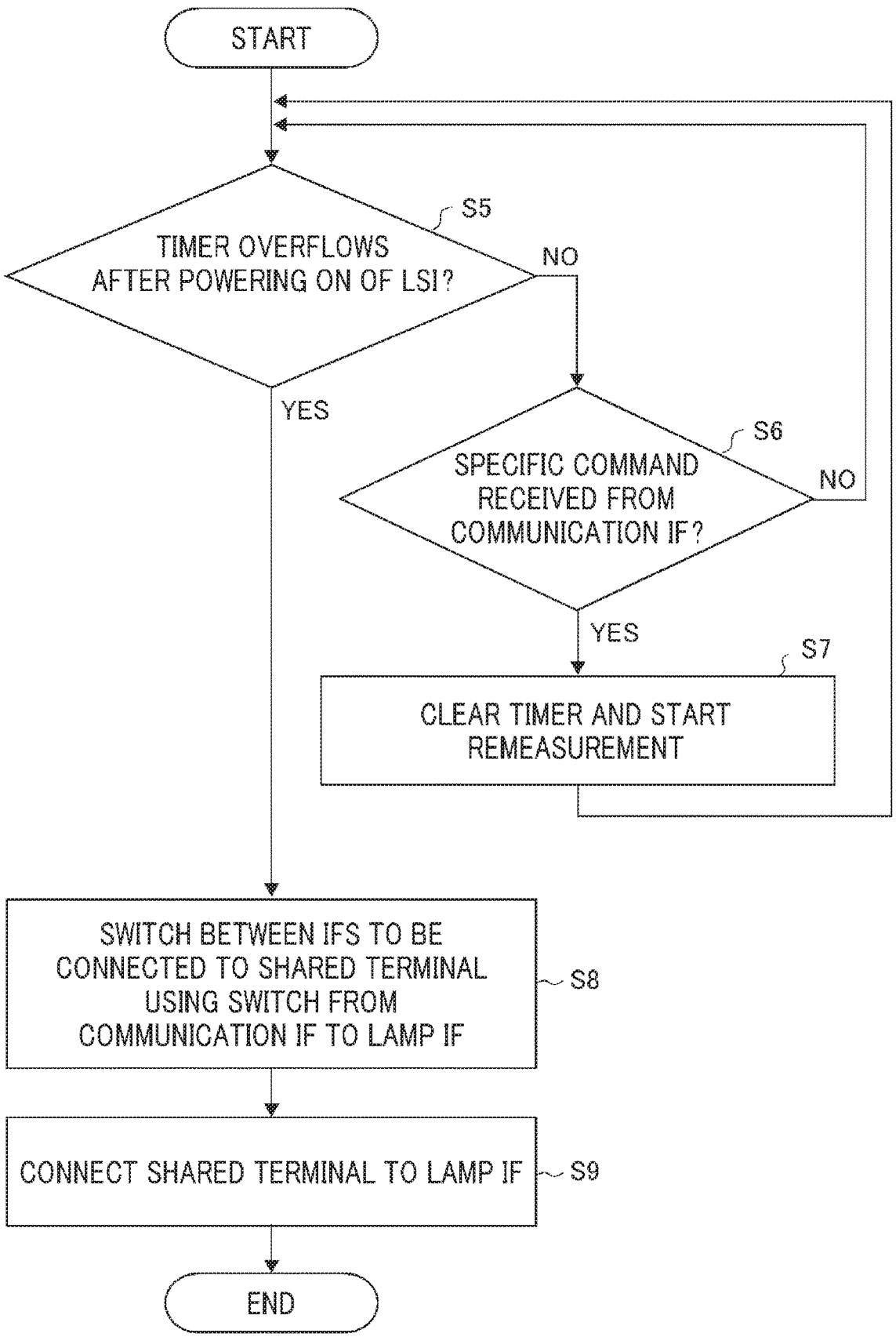
FIG. 5 is a flowchart showing a flow of processing of switching between interface circuits to be connected to a shared terminal in the vehicle generator control device according to the first embodiment of the invention.

FIG. 5 shows the flow of processing of switching between the IFs to be connected to the shared terminal 8, based on the shared terminal setting data stored in the PROM 12, in the LSI configuring the control device 2 according to the first embodiment. The PROM of the LSI in step S5 of FIG. 5 is the PROM which has carried out the processing in step S4 of FIG. 4.

In step S5 of FIG. 5, it is determined whether or not the timer section 14 has overflowed after the LSI is powered on (after asynchronous reset is released). When the timer section 14 has not overflowed (NO), the processing goes to step S6, and when the specific command is received from the communication IF 6 in step S6 (YES), the timer section 14 is cleared in step S7, remeasurement is started, and the processing returns to step S5.

Also, when the specific command is not received in step S6 (NO), the processing returns to step S5. When the timer section 14 has overflowed in step S5 (YES), the processing goes to step S8, and the switch 9 switches between the IFs to be connected to the shared terminal 8, from the communication IF 6 to the lamp IF 7. In step S69, the shared terminal 8 is thereby connected to the lamp IF 7.

Although not shown in FIG. 5, it is possible to rewrite the PROM 12 again by the time the timer section 14 overflows. In this case, the shared terminal setting data of the PROM 12 is rewritten into "communication IF effective" via the communication IF 6 between steps S5 and S6 or between steps S7 and S5.

As above, according to the control device 2 for the vehicle generator 1 of the first embodiment, the shared terminal setting data "communication IF effective" is stored in advance as the initial setting of the PROM 12, and thereby it is possible, when necessary, to rewrite the shared terminal setting data stored in the PROM 12 into "lamp IF effective" via the shared terminal 8 and the communication IF 6.

Also, as a configuration is such as to, instead of carrying out switching between the IFs to be connected to the shared terminal 8 immediately after the shared terminal setting data is rewritten, switch between the IFs after the timer section 14 overflows after the control device 2 is powered on, the communication IF 6 is effective until the timer section 14 overflows, and the shared terminal setting data stored in the PROM 12 can be rewritten again into "communication IF effective".

For these reasons, according to the first embodiment, it is possible to obtain the control device 2 for the vehicle generator 1 which can suppress an increase in the number of terminals and wirings and also can be used for a plurality of types with one LSI kind, and it is possible to suppress the number of LSI kinds to be developed, leading to an increasing efficiency in development. The invention is such that any of embodiments can be appropriately modified or omitted within the scope of the invention.

REFERENCE SIGNS LIST 1, 1A, 1B Vehicle generator, 2, 20A, 20B Control device, 3 Type A circuit, 4 Type B circuit, 5, 9 Switch, 6 Communication IF, 7 Lamp IF, 8 Shared terminal, 10 Diagnostic section, 11, 12 PROM, 13 Memory controller, 14 Timer section, 15 Mask ROM, 30 LSI manufacturing unit, 31 ECU, 32 Charge lamp

The invention claimed is:
1. A vehicle generator control device, comprising:
a plurality of interface circuits including a communication interface circuit which carries out transmission and reception of data with an external instrument;
a shared terminal which is a common terminal of the plurality of interface circuits, and is configured to be connected to one of the plurality of interface circuits via a switch circuit;
a nonvolatile programmable read only memory (ROM) which stores shared terminal setting data identifying which interface circuit among the plurality of interface circuits is to be connected to the shared terminal, and controls the switch circuit so that the one from among the plurality of interface circuits is connected to the shared terminal, based on the shared terminal setting data;

a diagnostic circuit which monitors the vehicle generator control device and a vehicle generator controlled by the vehicle generator control device and makes a determination whether or not there is an anomaly; and a timer which measures a period of time needed from a time the vehicle generator control device is powered on until the determination by the diagnostic circuit is made, wherein the nonvolatile programmable ROM, based on the shared terminal setting data being rewritten, controls the switching between the plurality of interface circuits to be connected to the shared terminal, based on the rewritten shared terminal setting data, after the timer expires after a next powering on of the vehicle generator control device.

2. The vehicle generator control device according to claim 1, further comprising:

a memory controller which controls the nonvolatile programmable ROM to store data received by the communication interface circuit, and carries out reading of the data stored in the nonvolatile programmable ROM, wherein the shared terminal setting data stored in the nonvolatile programmable ROM is rewritten via the shared terminal, the communication interface circuit, and the memory controller.

3. The vehicle generator control device according to claim 1, further comprising:

a lamp interface circuit which, based on the determination by the diagnostic circuit, controls lighting of a lamp connected to a vehicle's control device, wherein the nonvolatile programmable ROM stores the shared terminal setting data set at an initial setting for the communication interface circuit to be connected to the shared terminal, and the shared terminal setting data is rewritable for the lamp interface circuit to be connected to the shared terminal to control the lamp to be lit.

4. The vehicle generator control device according to claim 2, further comprising:

a lamp interface circuit which, based on the determination by the diagnostic circuit, controls lighting of a lamp connected to a vehicle's control device, wherein the nonvolatile programmable ROM stores the shared terminal setting data set at an initial setting for the communication interface circuit to be connected to the shared terminal, and the shared terminal setting data is rewritable for the lamp interface circuit to be connected to the shared terminal to control the lamp to be lit.

5. The vehicle generator control device according to claim 1, wherein when a specific command is received via the communication interface circuit by the time the timer expires, the timer is returned to an initial state and starts again to measure the period of time.

6. The vehicle generator control device according to claim 2, wherein when a specific command is received via the communication interface circuit by the time the timer expires, the timer is returned to an initial state and starts again to measure the period of time.

7. The vehicle generator control device according to claim 3, wherein when a specific command is received via the communication interface circuit by the time the timer expires, the timer is returned to an initial state and starts again to measure the period of time.

8. The vehicle generator control device according to claim 4, wherein when a specific command is received via the communication interface circuit by the time the timer expires, the timer is returned to an initial state and starts again to measure the period of time.

9. The vehicle generator control device according to claim 1, wherein the nonvolatile programmable ROM is protected by multiplexing or error correction.

10. The vehicle generator control device according to claim 2, wherein the nonvolatile programmable ROM is protected by multiplexing or error correction.

11. The vehicle generator control device according to claim 3, wherein the nonvolatile programmable ROM is protected by multiplexing or error correction.

12. The vehicle generator control device according to claim 4, wherein the nonvolatile programmable ROM is protected by multiplexing or error correction.

* * * * *